United States Patent Office 3,293,129
Patented Dec. 20, 1966

3,293,129
IMMUNIZATION OF CATTLE AGAINST VIRUS DIARRHEA VIRUS
James A. Baker, Ithaca, N.Y., assignor to Cornell Research Foundation, Inc., Ithaca, N.Y., a corporation of New York
No Drawing. Filed Feb. 1, 1962, Ser. No. 170,501
1 Claim. (Cl. 167—78)

The present invention relates to a method of producing an attenuated, non-virulent strain of virus diarrhea virus from a native virulent strain of virus diarrhea virus, and the use of the attenuated strain in the preparation of a standardized, effective and safe virus diarrhea virus vaccine.

Olafson and his co-workers and subsequently Baker and his co-workers, have shown that virus diarrhea of cattle is a clinical entity which is caused by a specific virus. Olafson, P., MacCallum, A. D. and Fox, F. H., Cornell Vet., 36, 205 (1946); Olafson, P. and Rickard, C. G., Cornell Vet., 37, 104 (1947); Baker, J. A., York, C. J., Gillespie, J. H. and Mitchell, G. B., Am. J. Vet. Res., 15, 525 (1954).

In attempts to attenuate virus diarrhea virus for use in a vaccine, Baker, J. A., York, C. J., Gillespie, J. H., and Mitchell, G. B., (1954), supra, transferred virus diarrhea virus, New York strain 1, through rabbits. Transfers up to the thirtieth passage were found to give little, if any, attenuation, calves inoculated with the material from rabbits showing temperatures, leukocyte counts, and other signs of illness similar to that produced by native material transferred in calves. Inoculation of susceptible calves with material that had been transferred in rabbits seventy-five (75) times, however, was found to produce a slight leukopenia and a temperature elevation that lasted for one day only. While the resulting attenuated virus obtained after the seventy-fifth transfer in rabbits was also found to immunize calves against virulent virus diarrhea virus, the preparation of a commercial vaccine from New York strain 1 by this method, proved costly and otherwise objectionable due to the difficulties encountered in animal transfers and particularly the number of animal passages required to modify the virus sufficiently for possible use in a vaccine. Also, as noted above, even after 75 animal transfers, the virus produced signs of illness in calves inoculated with vaccine made from this material.

In view of the inherent disadvantages in the use of animals to attenuate virulent virus, propagation of virus diarrhea virus New York strain 1, in tissue culture was investigated. Lee, K. M., and Gillespie, J. H., Am. J. Vet. Res., 18, 952–953 (1957). In this investigation, New York strain 1, virus diarrhea virus, was maintained for 20 consecutive passages in bovine embryonic skin-muscle tissue and for 15 further passages in embryonic bovine kidney cells. In this total of 35 serial transfers in tissue culture, no cytopathogenic effects in cells were observed and the virus apparently was maintained at full virulence. Lee and Gillespie, supra, for example, reported that calves inoculated with the eleventh, the twentieth, twenty-fifth, thirtieth and thirty-fifth tissue-cultured virus all showed signs of illness, even at $10^{-6}$ dilutions after the last transfer through each type of tissue culture system.

In continued investigation Indiana strain, 46, virus diarrhea virus, was maintained for 26 serial transfers in tissue cultured embryonic bovine kidney cells. No cytopathogenic effects were observed and no attenuation was noted. Calves, for example, inoculated with 1 ml. of undiluted fluid from the 5th and from the 26th transfers became ill and showed the typical signs of illness (diphasic temperature, leukopenia, etc.) observed when susceptible calves are inoculated with virulent native virus diarrhea virus. Gillespie, James H., and Baker, James A., The Cornell Veterinarian, 49, 439–442 (1959). Indiana strain 46, virus diarrhea virus, transferred in rabbits also remained infective for calves. Pritchard et al., Jour. Amer. Vet. Med. Assoc., 130, 383 (1957).

In continued investigations it was decided to attempt to attenuate virus diarrhea virus using another strain, and specifically Oregon C24V. This strain, reported as cytopathogenic by Gillespie, James H., Baker, James A., and McEntee, Kenneth, The Cornell Veterinarian, 50, 73–79 (1960), is on deposite at and can be obtained from the New York State Veterinary Virus Research Institute, Cornell University, Ithaca, New York. Propagation of the virus (Oregon C24V) was carried out in tissue cultured embryonic bovine kidney cells, Baker, James A., et al., Proc. U.S. Livestock Sanit. Assoc., 63, 143, 147, 148 (1959), although Gillespie, Baker and McEntee, supra, reported that the Oregon C24V strain propagated in this system produced signs of illness simliar to those produced by strain New York 1 of virus diarrhea. Passages in the embryonic bovine kidney cell culture, however, were continued in each cell culture until cytopathogenic effects were noted (e.g. 2–8 days) and the degree of attenuation, if any, was periodically determined by the inoculation of a susceptible calf. In this investigation, it was discovered that calves inoculated after 32 serial transfers showed no signs of illness. This was the first "break-through," but both the efficacy and the overall safety of a vaccine made from this material remained undetermined.

In the initial test, ten susceptible calves of about 4 months of age were divided into two equal groups. Group (1) was inoculated intramuscularly with 1 ml. of supernatant fluid obtained after the 32 transfers and group (2) remained unvaccinated as controls. Pairs of calves made up of a calf in each group were placed in contact is isolation units.

One month after vaccination all calves were bled and then given virulent virus diarrhea virus to determine immunity. The five vaccinated calves responded by developing neutralizing antibodies without showing signs of illness and all proved immune when given the virulent virus. The five unvaccinated control calves were initially susceptible and remainded so with no antibody development after one month of contact with the vaccinated calves, indicating that the vaccine virus did not transmit. When challenged with the virulent virus, all five control calves showed clinical signs of illness.

With these positive results, investigations were then extended to field tests using 224 animals from 13 dairy herds in which the animals ranged in age from 1 month to 7 years. About one-half (118) were vaccinated with the attenuated Oregon C24V virus as in the initial test- and the remainder were used as controls. Animals showing demonstrable antibodies prior to the start of the field test were discarded as unsuitable test animals. Under field conditions the vaccine continued to prove safe in producing no signs of illness and the neutralization test, as an indicator of immunity, showed an efficacy of about 95 percent. Robson, Douglas S., Gillespie, James H., and Baker, James A., The Cornell Veterinarian, 50, 503–509 (1960). The sequential rule for testing both safety and efficacy were more than adequately satisfied. Baker et al., Proc. U.S. Livestock Sani., Assoc., 63, 143, 162.

The attenuation of the Oregon C24V strain of virus diarrhea virus in cell cultures such as tissue cultured embryonic bovine kidney cells showing cytophathic effects represents a distinct advance in this art. The observable cell degeneration in such cultures, for example, not only shows the presence of live virus, but also pernits measurement of relative amounts of virus present n the culture field. This latter feature using conven- ional virus titrations, provide the means for standard- zing the vaccine.

I claim:

The method of immunizing cattle against virus diar- hea virus without thereby eliciting signs of illness com- prising inoculating susceptible cattle with a standardized, safe and effective virus diarrhea virus vaccine prepared n accordance with a process which comprises the step which consists essentially of serially passing Oregon C24V strain of native virulent virus diarrhea virus 32 imes through cell cultures of tissue cultured embryonic bovine kidney cells.

References Cited by the Examiner

UNITED STATES PATENTS

| | | | |
|---|---|---|---|
| 2,941,925 | 6/1960 | York | 167—78 |
| 3,122,477 | 2/1964 | Beckenhauer et al. | 167—80 |

OTHER REFERENCES

Baker et al. "Vaccination of Cattle for Increased Profits," U.S. Livestock Sanit. Assoc. Proc., 63, 143–165 (1959).

Bechenhauer et al.: "Immunization of Swine Against Hog Cholera With a Bovine Enterovirus," Vet. Med., 56, March 1961, pp, 108–112.

Coggins et al.: "Attenuation of Virus Diarrhea Virus (Strain Oregon C24V) for Vaccine Purposes," Cornell Vet., vol. LI, No. 4, pp. 539–545, October 1961.

Gillespie et al.: "A Cytopathogenic Strain of Virus Diarrhea Virus," Cornell Veterinarian, 50, pp. 73–79, January 1960.

Gillespie et al.: "Comparison by Neutralization Tests of Strain of Virus Isolated From Virus Diarrhea and Mocosal Disease," Cornell Vet., 51 (1), 155–159, January 1961.

Gillespie et al.: "Studies on Virus Diarrhea," Cornall Veterinarian, vol. XLIX, No. 4, pp. 439–442, October 1959.

Kniazeff et al: "Antigenic Relationships in the Bovine Viral Diarrhea-Mucosal Disease Complex," U.S. Livestock Sani. Assoc. Proc., 64, 344–350 (1960).

Lee et al.: "Propagation of Virus Diarrhea Virus of Cattle in Tissue Culture," Am. J. Vet. Res., 18, October 1957, pp. 952–953.

Robson et al.: "The Neutralization Test as an Indicator of Immunity to Virus Diarrhea," Cornell Vet., 50 (4), 503–509, October 1960.

Schwarz et al.: "Modification of Infectious Bovine Rhinotracheitis (IBR) in Tissue Culture and Development of a Vaccine," Proc. Soc. Exp. Biol. & Med., 96, November 1957, pp. 453–458.

LEWIS GOTTS, *Primary Examiner.*

MORRIS O. WOLK, FRANK CACCIAPAGLIA, Jr., *Examiners.*

D. LEVY, SHEP K. ROSE, *Assistant Examiners.*